United States Patent [19]
Wilcox

[11] 3,871,022

[45] Mar. 11, 1975

[54] NOISE AND OVERLOAD PROTECTION CIRCUIT FOR SYNCHRONOUS DEMODULATORS

[75] Inventor: Milton E. Wilcox, Tempe, Ariz.

[73] Assignee: Motorola, Inc., Chicago, Ill.

[22] Filed: Dec. 3, 1973

[21] Appl. No.: 421,291

[52] U.S. Cl. .................................... 358/23, 358/27

[51] Int. Cl. ............................................ H04n 9/50

[58] Field of Search ................... 358/23, 27; 329/50

[56] References Cited

UNITED STATES PATENTS

| | | | |
|---|---|---|---|
| 3,604,842 | 9/1971 | Harwood | 358/27 |
| 3,697,685 | 10/1972 | Lunn | 178/7.3 R |
| 3,760,094 | 9/1973 | Skerlos | 358/23 |

*Primary Examiner*—Richard Murray
*Assistant Examiner*—Aristotelis M. Psitos
*Attorney, Agent, or Firm*—Vincent J. Rauner; Maurice J. Jones, Jr.

[57] ABSTRACT

The protection circuit, which prevents an undesired synchronous demodulator output signal state, includes an electron control device having a first control electrode connected to a voltage reference supply terminal and a second control electrode connected to the input terminal of the synchronous demodulator. A second circuit is connected between the output terminal of the electron control device and the output terminal of the synchronous demodulator. The electron control device is rendered conductive in response to the magnitude of the input signal of the synchronous demodulator exceeding a first predetermined threshold level which is less than a second threshold level at which the demodulator provides the undesired output signal state. The second circuit responds to the electron control device being rendered conductive to provide a desired output signal state at the output terminal of the synchronous demodulator; even though, the magnitude of the input signal exceeds the second threshold level.

12 Claims, 4 Drawing Figures

NOISE AND OVERLOAD PROTECTION CIRCUIT FOR SYNCHRONOUS DEMODULATORS

BACKGROUND OF THE INVENTION

There are essentially two common methods of demodulation. One, called synchronous or coherent demodulation, consists of multiplying the incoming signal by the carrier frequency, and then low pass filtering the resultant multiplied signal. The other method is called envelope demodulation. Although, envelope demodulation appears to be the simplest and most convenient form of demodulation, it is known to be undersirable in some applications. More specifically, the modulation of a television I.F. carrier signal approaches 100 percent for much of the time. Thus, in order to maintain the necessary linearity in a simple diode type envelope detector, a large intermediate frequency (I.F.) output voltage is required to produce the two-to-four volts peak-to-peak detector output. The relatively high power output provided by the I.F. amplifier stage can cause large circulating currents with consequent difficulties in decoupling and shielding. Moreover, simple diode detector circuits also have low efficiency and tend to provide unwanted intermodulation products in the detected output. Synchronous demodulators, which operate with much smaller input voltages and ordinarily have a linear transfer characteristic, are advantageous in many applications.

Although the synchronous demodulator has many advantages over the simple diode detector which justifies its use in some applications, it also has functional disadvantages, particularly in response to overload and impulse noise. More specifically, as the amplitude of a modulated television or demodulator carrier input signal increases, the average magnitude of the demodulated composite video output signal changes in a first direction in proportion thereto until the threshold of the linear region of operation is reached. The average magnitude may be a positive value in response to input signals of a small magnitude and become increasingly less positive as the magnitude of the input signals increase. As the input signal magnitude is increased beyond the linear region, the demodulator is forced into an "overload mode" of operation. The demodulator output signal magnitude remains constant, for instance, at a ground potential until the input signal magnitude reaches the threshold of the "saturated mode" of operation. If the magnitude of the input signal is still further increased, the magnitude of the output signal suddenly undesirably changes in a second direction and stabilizes at, for instance, the positive level. Hence, in response to a large input signal, the output signal of a synchronous demodulator may have an average level corresponding to an input signal of a small magnitude. The false output signal may be produced partly because of saturation of the devices of the demodulator. Consequently, the automatic gain control circuit of the television receiver responds to the false level of the output signal and provides a gain control signal which further increases the gain of the television receiver and thereby further increases the magnitude of the input signal to cause an automatic gain control or overload lock-up. The television receiver is thereby rendered inoperative until the overload signal is removed.

Another problem inherent in low level synchronous demodulators is their sensitivity to some types of noise and particularly impulse noise. It is well-known that the magnitude of the output signal of such detectors depends on the relationship between the phase of the input signal and the phase of the carrier or switching signal. Erroneous signals, such as noise pulses, do not have a fixed phase relationship with respect to the carrier. Hence, although noise pulses usually have too short of a duration to cause automatic gain control lock-up, high level noise signals can cause the demodulator output signal level to undesirably change and provide an output signal of an undesired magnitude or polarity. Consequently, white spots may be reproduced on the television screen in response to large noise signals which occur along with desired signals having small magnitudes.

In order to solve the problems caused by signal overload and noise, prior art synchronous demodulators utilized bias networks requiring relatively high power supply voltages. Such networks and high power supply voltages assured that large magnitude input signals could not saturate the devices of the synchronous demodulator. Such circuits are not adaptable to low level applications wherein the power supply voltage may be limited, for instance, to a magnitude on the order of 10 volts. One such application relates to battery operated television receivers.

Other prior art circuits have utilized clamping techniques to limit the magnitude of the input signal. However, such circuits have been found to be undesirable in some applications. More specifically, such clamping circuits often increase the input impedance of the demodulator and thereby reduce its bandwidth.

SUMMARY OF THE INVENTION

It is one object of this invention to provide an improved demodulator circuit.

It is another object of this invention to provide a protection circuit for a signal processing circuit wherein the output signal state of the signal processing circuit is not adversely affected by input signal overload and impulse noise.

Still another object of the invention is to provide a protection circuit for assuring that a synchronous demodulator is not adversely affected by impulse noise or input signal overload and which does not undesirably decrease the bandwidth of the synchronous demodulator.

A further object of the invention is to provide a protection circuit for a synchronous demodulator which is capable of operating from relatively low supply voltages and which is suitable for being manufactured in integrated circuit form.

The invention pertains to a synchronous demodulator having a protection circuit which prevents the magnitude of the output signal of the demodulator from going to an undesirable level in response to input signals having large magnitudes. The protection circuit includes a first electron control device having a first electrode which is coupled to the input signal of the synchronous demodulator, a second electrode which is adapted to receive a reference voltage and a third electrode. The electron control device is rendered operative in response to the input signal exceeding a first threshold voltage which is less than a second threshold level at which the demodulator would otherwise provide the undesired output signal state. A second circuit couples the third electrode of the electron control device to the output terminal of the synchronous demodulator. The second circuit responds to the first electron control device being rendered operative to provide a desired output signal level at the output terminal of the synchronous demodulator or other signal processing circuit.

DETAILED DESCRIPTION OF THE PREFERRED EMBODIMENT

Figure 1:
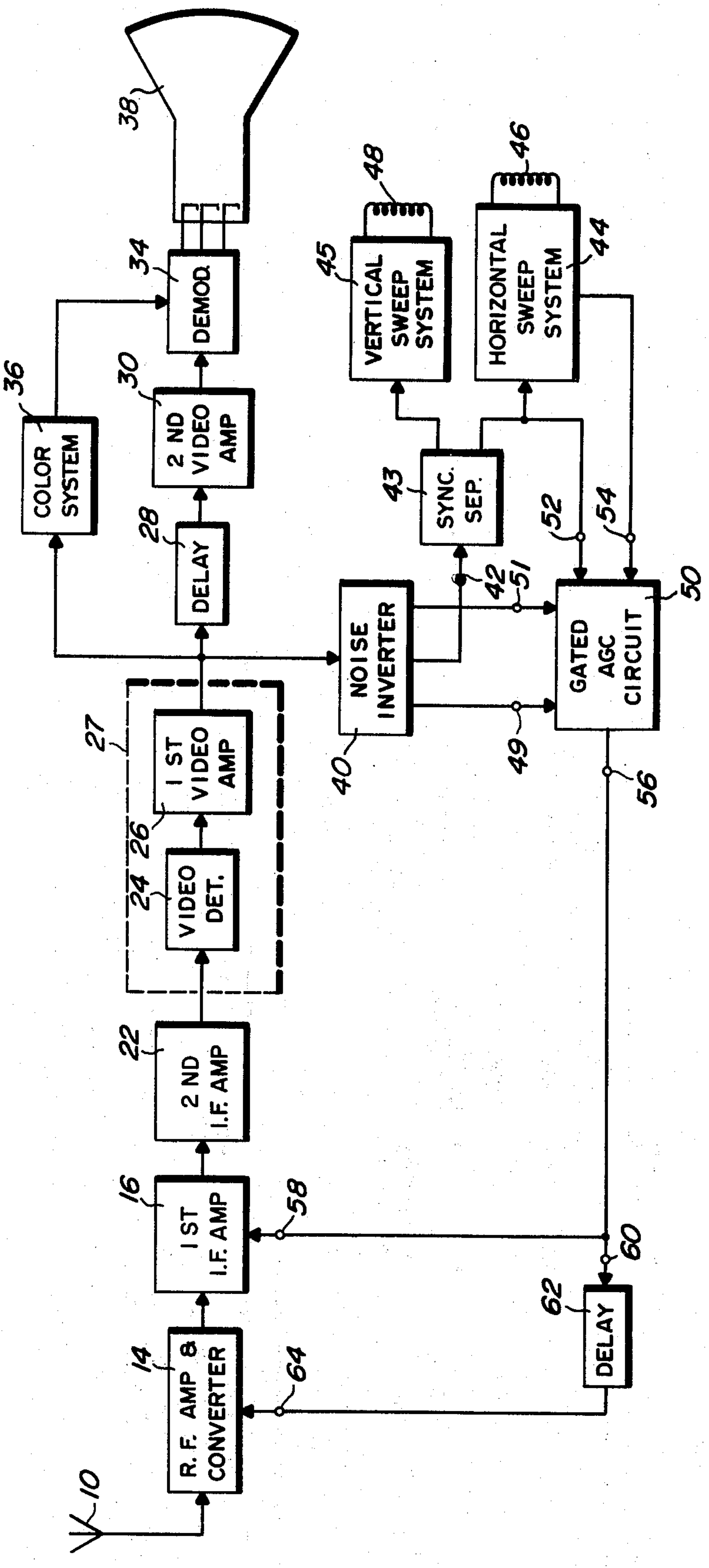
FIG. 1 is a partial block diagram of a television receiver including video detector and color system circuits which could include synchronous demodulators.

Referring now to the drawing, FIG. 1 shows a partial block diagram of a typical color television receiver in which an incoming signal is received by antenna 10 and is applied to a radio frequency (R.F.) amplifier and converter stage 14 which amplifies and reduces the frequency of the received signals to provide intermediate frequency (I.F.) signals at its output terminal. The I.F. signals which include an amplitude modulated I.F. carrier having a frequency on the order of 45.75 megahertz (MHz) are then amplified by I.F. amplifiers 16 and 22. The amplitude modulation of the output signal of I.F. amplifier 22 is demodulated or detected by video detector 24 which could include the synchronous demodulator of FIG. 2.

Figure 4:
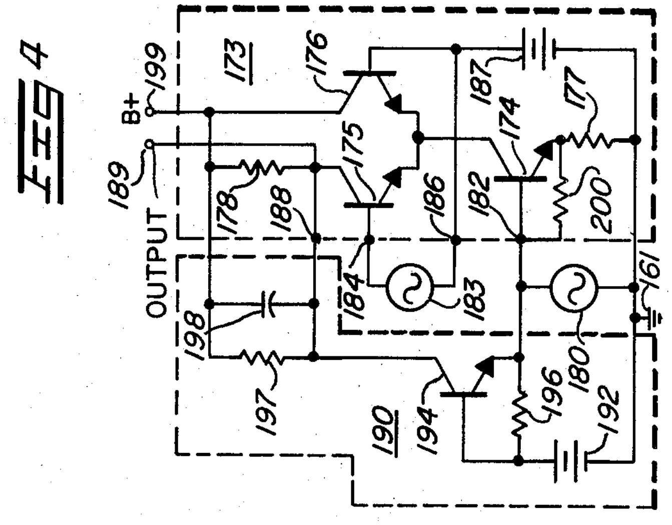
FIG. 4 is a schematic diagram of another protected synchronous demodulator.

The demodulated composite video signal is then amplified by video amplifier 26. Video detector 24 and video amplifier 26 may be included within a common integrated circuit structure as indicated by dashed block 27 of FIG. 1. The brightness components of the composite video signal are applied to the input terminal of delay circuit 28 and then delayed for purposes well-known to those skilled in the art. Next, the brightness signal components are amplifier by another video amplifier 30 and applied to a first input of demodulator circuit 34. The output signal of video amplifier 26 is also applied through color system 36 to a second input of demodulator circuit 34. Synchronous demodulators, as shown in FIG. 4, could be included in demodulator circuit 34. Red, blue and green color signals are provided to the three cathodes of cathode ray tube 38 by demodulator 34.

Video amplifier 26 also supplies the composite video signal to noise inverter 40, which detects noise signals having magnitudes in excess of the magnitude of the signal synchronizing components of the composite video signal. The detected noise pulses are then utilized to actuate a "clamp circuit " which limits the magnitude of the composite video signal applied to terminal 42 of synchronizing signal separator 43. Horizontal and vertical synchronizing signal components are derived by sync separator 43 and supplied to horizontal and vertical sweep systems 44 and 45. The sweep systems 44 and 45 develop horizontal sweep signals at horizontal deflection windings 46 and vertical sweep signals at vertical deflection winding 48. Windings 46 and 48 are placed on the neck of cathode ray tube 38. The horizontal synchronizing pulses are applied to terminal 52 of AGC circuit 50. The composite video output signal from noise inverter 40 is applied to terminal 49 of gated AGC circuit 50 and the detected noise pulses are applied to terminal 51 of circuit 50. The horizontal flyback pulses are coupled from the horizontal sweep system 44 to terminal 54 of gated AGC circuit 50.

A gain control voltage is developed by circuit 50 at AGC output terminal 56. This gain control signal ideally changes in amplitude according to the changes in peak amplitude of the synchronizing pulse components at the output of video detector 24, which are present during the gating intervals established by the flyback pulses. The strength and magnitude of the synchronizing pulses in turn is dependent upon the strength of the incoming signal occurring at antenna 10 so that the AGC voltage occurring at output terminal 56 of AGC circuit 50 is normally representative of the input signal strength. Depending on the nature of R.F. amplifier and converter 14 and first video I.F. amplifier 16, the gain control voltage at output terminal 56 may be a forward or a reverse control voltage.

AGC voltage is applied to control terminal 58 of first video I.F. amp 16 and to input terminal 60 of delay circuit 62. After appropriate delay, the AGC voltage is applied by delay circuit 62 to control terminal 64 of R.F. amplifier and converter circuit 14. Thus, the gain control voltage operates initially to control the gain of video I.F. stage 16 and, for increasing signal levels, operates to control the gain of the R.F. and converter stage 14 in a manner which is known in the art.

Figure 2:
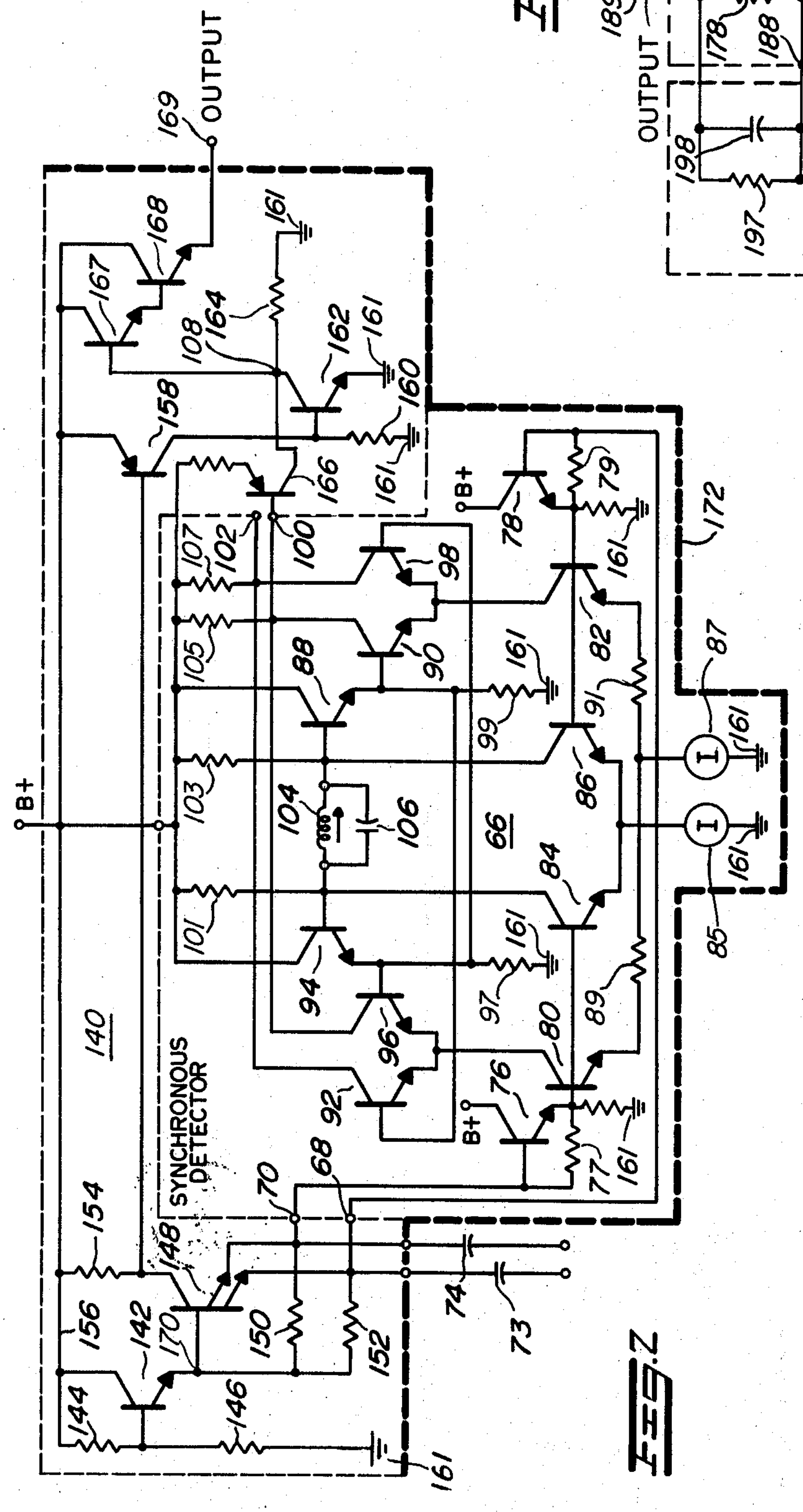
FIG. 2 is a partial block and partial schematic diagram of a protected synchronous demodulator employed in the video portion of a television receiver.
Figure 3:
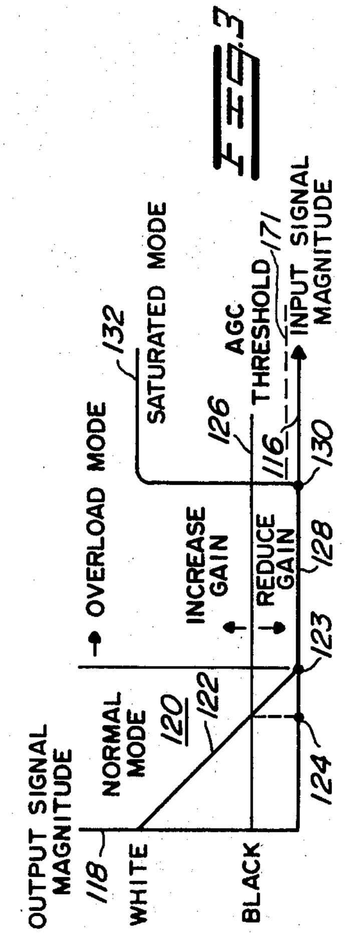
FIG. 3 is a graph illustrating operational characteristics of the video demodulator circuit of FIG. 2.

The structure and operation of the overload and noise protection circuit of one embodiment of the invention will first be explained with respect to an application associated with a video detector such as video detector 24 of FIG. 1. More specifically, FIG. 2 shows a video detector including synchronous detector 66 having balanced input terminals 68 and 70 which are driven through capacitors 73 and 74. Synchronous amplitude modulation (A.M.) detector 66 may be of a form well-known in the prior art such as disclosed by U.S. Pat. No. 3,697,685, which is entitled "Synchronous A.M. Detector" and which issued on Oct. 10, 1972 and is assigned to the assignee of the subject application. Detector circuit 66 includes input buffer transistors 76 and 78 which drive linear differential amplifier transistors 80 and 82 and high gain differential amplifier transistors 84 and 86. Current sources 85 and 87, respectively, supply differential pairs 84 and 86 and 80 and 82. A switching signal having the carrier or I.F. frequency is developed at the collectors of transistors 84 and 86 and applied through buffer amplifier transistor 88 to the base electrodes of transistors 90 and 92 and through buffer amplifier transistor 94 to the base electrode of transistors 96 and 98. Resistor 97 is connected to the emitter of transistor 94. Resistor 99 is connected to the emitter of transistor 88. The amplitude modulated video signal is applied through the collector of transistor 80 to the emitters of transistors 92 and 96 and through the collector of transistor 82 to the emitters of transistors 90 and 98. Since the switching or carrier signal is obtained by limiting the amplitude modulated I.F. signal, the switching signal has the same frequency and phase as the modulated I.F. signal and, therefore, is synchronous therewith. Transistors 90, 92, 96 and 98 mix the switching signals applied to their bases with the amplitude modulated signal applied to their emitters to provide a demodulated output signal at the terminals 100 and 102. The base of transistor 166 is connected to terminal 100 and provides an amplified output signal across load resistor 164 and output terminal 108. The tank circuit including inductor 104 and capacitor 106 in cooperation with buffer amplifiers 88 and 84 are necessary to reduce phase shifts in the switching signal. The gain requirements of the switching channel are dictated by the necessity of assuring that limiting takes place at the deepest modulation which is the white level. The load for demodulator 66 includes resistors 101, 103, 105 and 107. FIG. 3 illustrates the alternating current (A.C.) operation of circuit 66. Abscissa axis 116 indicates the peak-to-peak amplitude of the amplitude modulated I.F. input signal. The modulation is normally arranged so that its nulls are at the white level and its peaks are at the black level by the action of gated AGC circuit 50. The input signals applied through capacitors 73 and 74 are 180 degrees out-of-phase with each other. These input signals can be obtained from the balanced output terminals of differential amplifier I.F. stage 22. Alternatively, an unbalanced signal can be applied to one of input terminals 68 and 70 so long as the other input terminal is coupled to an A.C. ground. Ordinate axis 118 of FIG. 3 indicates the magnitude of the output signal and graph 120 indicates the transfer characteristic of detector circuit 66.

Portion 122 of graph 120 illustrates the linear range or "normal mode" of operation over which it is desired that low level detector 66 operate. Normally, AGC circuit 50 assures operation within the linear range. For instance, as the AGC threshold indicated by point 24 is exceeded by the magnitude of the input signal, AGC circuit 50 should reduce the gain which reduces the magnitude of the I.F. signal. Alternatively, if the magnitude of the I.F. input signal is less than that indicated at point 124, then AGC circuit 50 should increase the gain which increases the magnitude of the I.F. signal. However, if an exceedingly large input signal is suddenly applied to low level detector 66, such as in response to impulse noise, connection of an antenna or channel switching, it is possible for the magnitude of the input signal to exceed a first threshold indicated at point 123 of axis 116 and thereby causes the low level detector to move into a "overload" mode of operation during which the output signal level remains constant as indicated by portion 128 of graph 122. If the magnitude of the input signal is increased still further in excess of a second threshold indicated by point 130, then it is possible for low level detector 66 to suddenly provide an output signal exceeding the white level as indicated by portion 132 of graph 120. This happens because, for instance, transistors 84 and 86 are driven into saturation by the input signal which results in the base-to-collector junctions of transistors 84 and 86 being forward biased. Thus, transistors 84 and 86 no longer invert the signals applied thereto. Consequently, the phase of the signals of transistors 84 and 86 no longer facilitate operation of the detector. Moreover, the saturation of transistors 80 and 82 can cause transistors 92 and 96 and 90 and 98 to be rendered nonconductive. The combination of these occurrences result in the output signal assuming a relatively positive constant level as indicated by portion 132 of graph 120. Consequently, the AGC circuit interprets the positive level of the detector output signal as indicating a need to increase the gain and thereby provides a control signal which results in the magnitude of the already too large input signal being increased further. This condition is known as the "AGC lock-up."

Protection circuit 140 prevents the magnitude of the output signal of detector 66 from increasing above AGC threshold or black level 126, for instance, in response to signal overload or noise having a relatively large magnitude as compared to the magnitude of the desired input signal. Circuit 140 includes a voltage reference supply having transistor 142, and a voltage divider comprised of resistors 144 and 146. An electron control device, shown as dual emitter NPN transistor 148, has a first emitter electrode connected to input terminal 70 and a second emitter electrode connected to input terminal 68. The base electrode of transistor 148 is connected to the emitter electrode of transistor 142 and through resistors 150 and 152, respectively, to input terminals 70 and 68. The collector electrode of transistor 148 is coupled through resistor 154 to a conductor 156 which is adapted to supply a positive (B+) supply voltage. PNP transistor 158 includes a base electrode connected to the junction between the collector of transistor 148 and one end of resistor 154, an emitter electrode connected to conductor 156 and a collector electrode connected through resistor 160 to ground conductor 161, which may be adapted to supply a reference voltage having a magnitude that is less positive than the B+ supply voltage.

Transistor 162 includes a base electrode connected to one end of resistor 160 and to the collector of transistor 158, an emitter electrode connected to ground conductor 161 and a collector electrode connected to output terminal 108 of detector 66. Load resistor 164 is connected between output terminal 108 and ground conductor 161. A Darlington circuit including transistors 167 and 168 or another appropriate output stage can be connected between output terminal 108 and a pin-out terminal 169.

In operation, the voltage supply comprised of transistor 142 and resistors 144 and 146 supplies a bias voltage through output terminal 170 to the base of dual emitter transistor 148 and through resistors 150 and 152 to transistors 76 and 78 of detector 66. During "normal mode" operation, the magnitude of the I.F. input signal between terminals 68 and 70 is on the order of 50 millivolts, RMS. This input level operates the detector within the linear range and provides a demodulated output signal across load resistor 164, as previously described. During this "normal mode" of operation, transistor 148 remains nonconductive and thereby assures that transistors 158 and 162 remain nonconductive.

If an input signal having a magnitude larger than the threshold represented by point 123 on the graph of FIG. 3 or some other predetermined threshold is applied, the negative going swing of the input signal in cooperation with the bias potential developed at terminal 170 is sufficient to cause transistor 148 to become forward biased. Since terminals 68 and 70 receive I.F. signals, which are 180° out of phase with respect to each other, transistor 148 will remain forward biased during the majority of its duty cycle so long as the overload condition or low signal-to-noise ratio exists. Resistors 77 and 79 placed across the base-emitter junctions of transistors 76 and 78 cause current to flow in resistors 150 and 152 which develops a partial bias on transistor 148 thereby rendering the circuit more sensitive to negative going-signal swings.

When transistor 148 is rendered conductive, it draws current through resistor 154 which produces a voltage that renders transistor 158 conductive. Transistor 158, which may be a lateral PNP, is intentionally chosen to have a poor frequency response and tends to remain conductive even though transistor 148 may be rapidly turning on and off in response to the modulated I.F. signal. Hence, transistor 158 operates somewhat like a capacitor. Transistor 158, while conductive, provides current through resistor 160 to ground conductor 161. Consequently, transistor 162 is rendered conductive by the resulting voltage developed across resistor 160 and holds the voltage at output terminals 108 and 169 to a relatively low level, as indicated by dashed graph portion 171 of FIG. 3 rather than letting the output level jump up into the white level as indicated by graph portion 132 of FIG. 3. Consequently, AGC circuit 50 receives a "reduced gain" control signal and pulls the amplitude of the input signal back into the normal region of operation. Consequently, "AGC lock-up" is prevented. Furthermore, overload protection circuit 140 also operates in response to noise signals having amplitudes which are large with respect to the amplitudes of the desired signals. Consequently, bright picture spots otherwise caused by such noise signals are reduced. Thus, the output signal state of detector 66 remains at a desired level regardless of whether the transistors of detector 66 are saturated or not.

Overload protection circuit 140 bypasses detector 66 whenever the input signal magnitude crosses a first predetermined threshold which is less than the threshold indicated by point 130 on graph 120 of FIG. 3. Thus, whenever a large signal is present at the input terminals, whether it is the I.F. signal in an overloading condition or a relatively large noise pulse, transistor 148 is rendered conductive. Consequently, the voltage at output terminals 108 and 169 is held to a desired level.

If the overload protection circuit were not employed, then detector 66 would have to be designed such that the output did not go positive under the foregoing conditions. This could require that the input differential amplifier including transistors 76 and 78 be designed to take large input signal swings. In order for detector 66 to operate in a linear manner in response to large signal levels, transistors 84 and 86 would have to be prevented from cutting off or saturating. This implies that their bias voltages would have to be larger than the bias voltage required by the circuit shown in FIG. 2. Consequently, overload protection circuit 140 enables synchronous detector circuits, such as circuit 66, to operate with a power supply voltage of lower magnitude applied between power supply conductors 156 and 161 than otherwise would be the case thereby facilitating its use in portable or other battery operated equipment. Overload protection circuit 140 can be readily modified to operate with other types of synchronous detectors.

The circuitry included within dashed block 172 of FIG. 2 is suitable for being provided in integrated circuit form. Values of some of the components and voltages utilized in an operational version of overload protection circuit 140 are as follows:

| | | |
|---|---|---|
| Capacitors 73 and 74 | .002 | microfarad |

-Continued

| | | |
|---|---|---|
| Resistors 150 and 152 | 3 | kilo-ohms |
| Resistor 154 | 50 | kilo-ohms |
| Resistor 160 | 10 | kilo-ohms |
| Resistor 164 | 4.5 | kilo-ohms |
| Voltage at the base of transistor 148 | 4.5 | volts |

Although noise protection circuit 140 has been described with respect to a synchronous demodulator having a balanced input, it will be apparent to those skilled in the art that it may be modified in numerous ways to protect synchronous demodulator circuits having other configurations. More specifically, FIG. 4 shows a detector circuit 173 of known configuration including transistors 174, 175 and 176 and resistors 177 and 178. Signal source 180 applies a single ended, amplitude modulated signal to input terminal 182. Moreover, signal source 183 applies another input signal, having a constant amplitude and which has equal frequency to the signal of generator 180, between input terminals 184 and 186 of synchronous demodulator 173. Battery 187, which may be another bias network is connected between the base of transistor 176 and a ground or reference potential. Ideally, a demodulated output signal is provided across load resistor 178 and at output terminals 188 and 189. If the magnitude of the modulated input signal provided by source 180 is allowed to exceed a predetermined threshold, transistor 174 will become saturated and its base-to-collector junction will become forward biased to result in the nonconduction of transistors 175 and 176 and an undesirable positive level at output terminals 188 and 189.

To prevent the foregoing result, overload protection circuit 190, of another embodiment of the invention, is provided. Circuit 190 includes a voltage reference supply depicted by battery 192 but which may take any one of a plurality of known forms such as the previously described voltage reference supply including devices 142, 144 and 146 of FIG. 2. Transistor 194 includes a base electrode connected to receive the reference voltage potential and an emitter electrode connected to input terminal 182. Resistor 196 connects the base of transistor 194 to input terminal 182. The collector electrode of transistor 194 is connected through resistor 197 to B+ or positive supply conductor 199 and to output terminals 188 and 189. Capacitor 198, which is analogous to lateral PNP transistor 158 of the circuit of FIG. 2, is connected between the collector of transistor 194 and positive power supply conductor 199. Resistor 200 increases the sensitivity of transistor 174.

In operation, if the magnitude of the signal provided by signal source 180 exceeds a predetermined threshold, the negative excursions thereof in cooperation with the reference voltage supplied by battery 192 render transistor 194 conductive. Consequently, current will be drawn through resistor 197 to provide a negative voltage relative to the B+ potential across capacitor 198. Even though transistor 194 is being switched on and off by the positive and negative excursions of the input signal, capacitor 198 will integrate the output signal of transistor 194 and hold output terminal 188 to a relatively constant level. Of course, capacitor 198 could be replaced by devices 158, 160 and 162 of FIG. 2.

What has been described, therefore, is an improved demodulator circuit including a synchronous detector and a protection circuit which prevents the synchronous detector from being adversely affected by signal overload conditions and noise. The demodulator circuit is suitable for being manufactured in integrated circuit form and is operable at relatively low power supply voltages on the order of 10 volts. Moreover, the demodulator circuit has a low input impedance which enables a wide bandwidth of operation such as is required of the video detector of a television receiver. The protection circuit could also be utilized with frequency and phase demodulators, such as a chroma demodulator.

It is contemplated that after having read the above descriptions of the preferred embodiments, those skilled in the art may foresee alterations and modifications which have not been pointed out with particularity herein. Accordingly, this disclosure is intended as being in the nature of explanatory illustrations only and it is in no way to be considered as limiting. Therefore, the appended claims are to be interpreted as covering all modifications which fall within the true spirit and scope of the invention. Although specific types of components have been disclosed, for exemplary purposes, it should be understood that a variety of components may be utilized by those skilled in the art.

I claim:

1. In a signal processing circuit having an input terminal adapted to receive an input signal and an output terminal at which an output signal is developed, the signal processing circuit tending to provide an output signal of undesired magnitude in response to the magnitude of the input signal exceeding a first threshold level, a protection circuit for controlling the magnitude of the output signal including in combination:

voltage reference supply means having an output terminal;

first electron control means having a first electrode, a second electrode connected to said output terminal of said voltage reference supply means, and a third electrode;

first circuit means coupling said first electrode of said first electron control means to the input terminal of the signal processing circuit, said first electron control means being rendered operative in response to the input signal exceeding a second threshold level which is less than the first threshold level; and second circuit means coupled to said third electrode of said first electron control means and to the output terminal of the signal processing circuit, said second circuit means being responsive to said first electron control means being rendered operative to provide a desired output signal at the output terminal of the signal processing circuit.

2. The combination of claim 1 wherein said voltage reference supply means includes:

a first conductor adapted to apply a power supply voltage of a first magnitude;

a second conductor;

first resistive means connected between said first conductor and a circuit node;

second resistive means connected between said circuit node and said second conductor; and semiconductor transistor means having a control electrode connected to said circuit node, a first electrode connected to said first conductor and a second electrode forming said output terminal of said voltage reference supply means.

3. The combination of claim 1 wherein:

said first electron control means includes first semiconductor transistor means having a base electrode connected to said output terminal of said voltage reference supply means, said first electrode, and said third electrode; and said first circuit means includes first resistive means connected between said base electrode and said first electrode of said first semiconductor transistor means.

4. The combination of claim 3 wherein said second circuit means includes:

second resistive means connected to said third electrode of said first semiconductor transistor means;

second semiconductor transistor means having a control electrode coupled to said first semiconductor transistor means, and an output electrode; and third circuit means coupling said output electrode of said second semiconductor transistor means to the output terminal of the signal processing circuit.

5. The combination of claim 4 wherein said third circuit means includes a third semiconductor transistor means.

6. A demodulator circuit suitable for being manufactured in integrated circuit form and for operating at low power supply voltages including in combination:

synchronous demodulator means having an input terminal adapted to receive a modulated input signal and an output terminal at which a demodulated output signal is developed, said synchronous demodulator means tending to provide an output signal of undesired magnitude in response to the magnitude of the input signal exceeding a first threshold level;

first conductor means adapted to supply a first power supply voltage of a first magnitude;

second conductor means;

voltage reference supply means connected between said first conductor means and said second conductor means, said voltage reference supply means providing a reference voltage at an output terminal thereof;

first electron control means having a first electrode, a second electrode connected to said output terminal of said voltage reference means and a third electrode;

first circuit means connecting said first electrode and said second electrode of said first electron control means to said input terminal of said synchronous demodulator means, said first electron control means being rendered conductive in response to the input signal exceeding a second threshold level which is less than said first threshold level; and second circuit means coupled between said third electrode of said first electron control means and said output terminal of said synchronous demodulator means, said second circuit means being responsive to said first electron control means being rendered conductive to provide a desired output signal level at the output terminal of said synchronous demodulator means.

7. The demodulator circuit of claim 6 wherein:

said first electron control means includes first semiconductor transistor means having said first, second and third electrodes; and said first circuit means including a first resistive means connecting said first electrode of said first semiconductor transistor means to said second electrode of said first semiconductor transistor means, said first resistive means cooperating with said voltage reference supply means to render said first semiconductor transistor means conductive in response to said input signal exceeding said second threshold level.

8. The demodulator circuit of claim 7 wherein:
said synchronous demodulator means has first and second input terminals, said first input terminal being connected to said first resistive means;
said first semiconductor transistor means has first and second emitter electrodes, said first emitter electrode being said first electrode of said first electron control means, and said second emitter electrode comprising a fourth electrode; and
said first circuit means further including a second resistive means connecting said second input terminal of said synchronous demodulator means to said second emitter electrode.

9. The demodulator circuit of claim 6 wherein said second circuit means includes:
third resistive means coupled between said third electrode of said first electron control means and said first conductor means; and
charge storage means connected between said third electrode of said first electron control means and said first conductor means.

10. The demodulator circuit of claim 9 wherein said charge storage means is formed by a lateral PNP transistor having emitter, base and collector electrodes.

11. The demodulator circuit of claim 10 wherein:
said base electrode of said lateral PNP transistor is connected to said third electrode of said first electron control means, said emitter electrode of said lateral PNP transistor means is connected to first conductor means; and
further including second electron control means having a first electrode connected to said collector of said lateral PNP transistor and a second electrode connected to said output terminal of said synchronous demodulator means.

12. The demodulator circuit of claim 11 wherein said second electron control means includes second semiconductor transistor means.

* * * * *